(12) United States Patent
Saloni et al.

(10) Patent No.: US 12,402,012 B2
(45) Date of Patent: Aug. 26, 2025

(54) CHANNEL ALLOCATION IN WIRELESS LOCAL AREA NETWORK

(71) Applicant: Hewlett Packard Enterprise Development LP, Spring, TX (US)

(72) Inventors: Shubham Saloni, San Jose, CA (US); Nethra Muniyappa, San Jose, CA (US); Rishabh Gupta, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 450 days.

(21) Appl. No.: 18/045,638

(22) Filed: Oct. 11, 2022

(65) Prior Publication Data

US 2024/0121618 A1    Apr. 11, 2024

(51) Int. Cl.
*H04W 16/10* (2009.01)
*H04W 72/0453* (2023.01)
*H04W 64/00* (2009.01)
*H04W 84/12* (2009.01)

(52) U.S. Cl.
CPC ....... *H04W 16/10* (2013.01); *H04W 72/0453* (2013.01); *H04W 64/003* (2013.01); *H04W 84/12* (2013.01)

(58) Field of Classification Search
CPC ..... H04W 16/10; H04W 16/18; H04W 16/06; H04W 72/0453; H04W 64/003; H04W 84/12; H04W 24/02
See application file for complete search history.

(56) References Cited

U.S. PATENT DOCUMENTS

| | | | |
|---|---|---|---|
| 9,161,293 B2 | 10/2015 | Choudhary et al. | |
| 9,276,718 B2 | 3/2016 | Llairo et al. | |
| 9,743,451 B2 | 8/2017 | Lopes et al. | |
| 10,251,123 B2 | 4/2019 | Desai et al. | |
| 10,405,204 B2 | 9/2019 | Kowal et al. | |
| 10,645,588 B2 | 5/2020 | Mahoney et al. | |
| 10,687,226 B2 | 6/2020 | Bahr | |
| 10,791,510 B2 | 9/2020 | Tellado et al. | |
| 10,869,264 B2 | 12/2020 | Bahr et al. | |
| 2006/0153153 A1* | 7/2006 | Bhagwat | H04K 3/86 370/338 |
| 2018/0249406 A1* | 8/2018 | Tellado | H04L 47/2491 |
| 2019/0075469 A1* | 3/2019 | Mahoney | H04B 17/318 |
| 2020/0229086 A1 | 7/2020 | Monajemi et al. | |

* cited by examiner

*Primary Examiner* — Farid Seyedvosoghi
(74) *Attorney, Agent, or Firm* — Hewlett Packard Enterprise Patent Department (57) ABSTRACT

An example method of allocating channels to access points (AP) is presented. A network manager may determine weights of the APs based on a channel metric and a location metric for APs. Further, the network manager may identify a first set of APs based on the weights and allocate a dedicated first channel to each of the first set of APs for its sole use. Accordingly, each of the first set of APs may use a respective dedicated first channel thereby reducing the performance impact on other APs. Further, the network manager may identify a second set of APs based on the weights and allocate second channels for sharing among the second set of APs. Since the second set of APs does not share any channel with the first set of APs, the performance of the second set of APs may not be impacted due to the first set of APs.

20 Claims, 5 Drawing Sheets

CHANNEL ALLOCATION IN WIRELESS LOCAL AREA NETWORK

BACKGROUND

Typically, a Wireless Local Area Network (WLAN) includes access points hosted at several locations in a facility to provide wireless connectivity to client devices. Client devices such as laptops, personal computers, smartphones, etc. may connect to an AP in the WLAN to exchange data. An AP may be configured to operate on a plurality of wireless frequency bands, such as a 2.4 gigahertz (GHz) frequency band, a 5 GHz frequency band, and a 6 GHz frequency band, based on a version of the Institute of Electrical and Electronics Engineers (IEEE) 802.11 Specification that it supports, or any newer or updated frequency bands that may be supported by future wireless communication techniques and/or standards (e.g., future IEEE standards). Client devices can connect to the AP on any of the wireless frequency bands that the client devices and the respective AP supports. In each of these wireless frequency bands, there exist multiple channels over which the AP and the client devices may communicate with each other. In some implementations, due to certain local restrictions, a limited number of channels may be available for use by the APs. Therefore, typically, in some implementations, two or more APs may share a channel.

BRIEF DESCRIPTION OF THE DRAWINGS

One or more examples in the present disclosure are described in detail with reference to the following Figures. The Figures are provided for purposes of illustration only and merely depict examples.

The Figures are not exhaustive and do not limit the present disclosure to the precise form disclosed.

DETAILED DESCRIPTION

An AP may support wireless communication over several wireless frequency bands depending on the version of the IEEE 802.11 specifications it supports. A wireless frequency band may be a range of radio wave frequencies to transmit data in the wireless spectrum. Example frequency bands that may be supported by APs as per the latest IEEE 802.11 specifications may include a 2.4 GHz frequency band, a 5 GHz frequency band, and a 6 GHz frequency band. In the future, additionally or alternatively, the APs may support any other frequency band(s) that may be introduced in future versions of the wireless communication standards. The examples presented herein may apply to such future wireless frequency bands as applicable to the currently implemented wireless frequency bands.

Generally, each wireless frequency band may be divided into several channels. Accordingly, a channel may be a sub-range of radio wave frequencies within a given wireless frequency band. In each of these frequency bands, there may exist a limited number of non-overlapping channels and a relatively higher number of overlapping channels (for example, in the case of the 2.4 GHz frequency band). Due to the limited number of non-overlapping channels, overlapping channels are also very commonly used by APs. With the use of overlapping channels, the chances of inter-channel interference may increase. Moreover, certain local regulatory requirements may also restrict the total number of available channels for use in WLAN. In particular, due to specific requirements (e.g., use of certain frequencies for Radio Detection and Ranging (RADAR)) by the regulatory authorities and the differences in spectrum allocations around the world, not all WLAN channels may be available in many countries.

For instance, the IEEE 802.11ac standard (e.g., Wi-Fi 6) introduced the support for wider 80 megahertz (MHz) and 160 MHz radio frequency channels. The use of wider channels and utilization of the dynamic frequency selection (DFS) technique in the 5 GHz frequency band and certain regulatory restrictions, may reduce the number of channels available for use in WLAN deployments operating per the IEEE 802.11ac standard. In some instances, as few as 3 or 4 channels may be available in such a WLAN deployment. Further, the draft IEEE 802.11be Specification also offers much wider channels (e.g., 320 MHz and an increased number of channels wider than 80 MHz). Again, the use of the wider channels and any applicable regulatory restriction may reduce the number of available channels for use in a WLAN deployment.

Due to the availability of a limited number of channels for use in WLAN deployments, channel sharing may be useful and is typically implemented to accommodate a large number of APs to serve an increased number of client devices. In particular, in dense WLAN implementations where the number of APs is more than the available number of channels, a certain number of APs may have to share channels with other APs. The APs that share a given channel may be referred to as co-channel APs for the given channel.

Sharing of channels by multiple APs has associated challenges. For instance, a co-channel AP's use of a shared channel may vary depending on the type of data traffic and the nature and/or count of the client devices that the co-channel AP is communicating with. In some instances, one of the co-channel APs may heavily use the shared channel compared to other co-channel APs. This may result in reduced bandwidth available for other co-channel APs on the same shared channel, thereby negatively impacting other co-channel APs' performance. For example, a given AP of several APs deployed in a conference room may have extremely high data traffic. Due to such high traffic on the given AP if the given AP shares a channel with other APs (i.e., co-channel APs), the capabilities of co-channel APs to serve their respective client devices may be affected. Also, if a new AP joins a shared channel upon reboot and its co-channel AP is heavily utilizing the shared channel, the new AP may not be able to serve its associated client devices well.

In accordance with examples consistent with the present disclosure, an enhanced technique of channel allocation via a central entity, for example, a network manager, is presented. The network manager may be implemented as a service hosted on a cloud platform or a WLAN controller deployed within the network in which APs are deployed. In particular, in some examples, a central entity such as the network manager may allocate channels to APs on the network in such a way that the performance impact on co-channel APs on a given shared channel may be reduced. This may be achieved at least partially as the network manager may be configured to factor-in channel metric and location metric derived respectively based on channel-specific parameters and locations for each of the APs in planning the channel allocations to the APs.

To enable the enhanced allocation of channels, the network manager may be configured to determine a channel metric and a location metric for APs deployed in a network. The channel metric may be a measure of the utilization and/or quality of a channel which may be determined based on channel-specific parameters such as channel utilization and a Modulation Coding Scheme (MCS) index, for example. The network manager may then determine a weight corresponding to each of the plurality of APs based on the channel metric and the location metric. In particular, the weight of an AP may be representative of a priority of the AP in terms of channel utilization. A higher weight of a given AP may indicate that the given AP may use the channel more heavily compared to other co-channel APs utilizing the same channel. Based on the weights of the APs, the network manager may identify a first set of APs, for example, the APs having weights higher than a predetermined threshold value which may prominently load respective channels that they may use. The network manager may allocate a dedicated channel to each AP of the first set of APs for its sole use. Accordingly, each of the first set of APs may use a respective dedicated channel, thereby reducing the performance impact on other APs in the network. Further, the network manager may identify a second set of APs based on the weights and allocate one or more channels for the shared use by the second set of APs. Since the second set of APs does not share any channel with the first set of APs, the performance of the second set of APs may not be impacted due to the first set of APs.

As will be appreciated, the use of the parameters such as the channel metric and the location metric of the APs in determining the weights of the APs aids in identifying a set of APs (e.g., the first set of APs) that are heavy consumers of the channels for a particular location. Also, the use of the location metric information of the APs may aid the administrators of the network to customize the weights of the APs depending on the location metric of the AP. For example, if an event is planned or ongoing in a conference room, the administrator may suitably adjust a location metric for the APs in the conference room, causing the weight of these APs to increase. The proposed network manager allocates channels to the APs based on their respective weights. Accordingly, the network manager may allocate dedicated channels to the identified APs that may heavily use those channels, and one or more of the remaining channels may be shared among the rest of the APs. Such a channel allocation not only results in effective usage of a limited number of available channels but also enhances the performance of the APs in the network which otherwise would have been negatively impacted due to channel sharing with APs that use the channels heavily.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1:
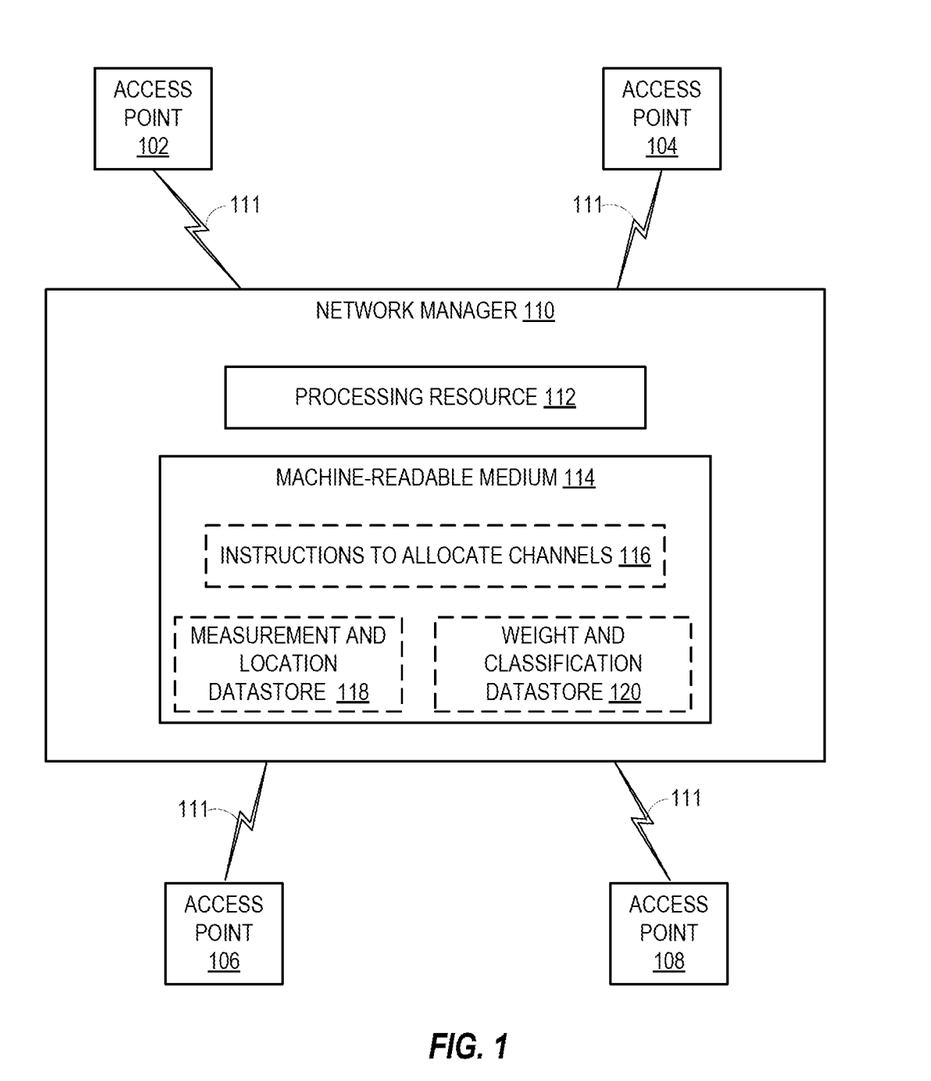
FIG. 1 depicts a system in which various of the examples presented herein may be implemented.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented in any setup for example, in a home setup or an organization, such as a business, educational institution, governmental entity, healthcare facility, or other organization. The system 100 may include a plurality of access points (APs), for example, APs 102, 104, 106, and 108, hereinafter collectively referred to as APs 102-108. Further, the system 100 may include a network manager 110 communicatively coupled to the APs 102-108. Although the system 100 is shown to include four APs 102-108, in some implementations, the system 100 may also include a greater or fewer number of APs than depicted in FIG. 1. Further, although not shown in FIG. 1, in some examples, the system 100 may include additional network devices such as additional APs, wireless local area network (WLAN) controllers, network switches, gateway devices, routers, client devices, and the like.

Each of the APs 102-108 may be a device including a combination of hardware, software, and/or firmware that is configured to provide wireless network connectivity to respective client devices (not shown). An AP such as any of the APs 102-108 may connect to a wired router, switch, or hub via an Ethernet cable, and provide wireless connectivity to nearby wireless capable devices. In some examples, the APs 102-108 may be distributed across one or more geographical regions, for example, within the same or different buildings. For example, for the system 100 implemented in an organization, some of the APs may be deployed in a conference room, some may be deployed in a cafeteria, and some may be deployed in a gym or common guest area. In some examples, the APs 102-108 may comprise, be implemented as, or known as routers, radio transceivers, network switches, Wi-Fi hotspot devices, Basic Service Set (BSS) devices, Extended Service Set (ESS) devices, radio base stations (RBSs), or some other terminology and may act as a point of network access for respective client devices.

The APs 102-108 may form a WLAN and provide wireless connectivity to respective client devices as per supported Wi-Fi standards, for example, various IEEE 802.11 standards. Examples of the client devices that may connect to the APs 102-108 may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like. In some examples, the APs 102-108 may be connected to a wired network via devices such as a network gateway (not shown) which may be a router, a digital-to-analog modem, a cable modem, a Digital Subscriber Line (DSL) modem, or some other network device configured to communicate to the network manager 110.

The client devices may connect to the APs 102-108 over one or more of the wireless frequency bands, also referred to as, radios. Example frequency bands that may be supported by APs 102-108 as per the latest IEEE 802.11 specifications may include a 2.4 GHz frequency band, a 5 GHz frequency band, and a 6 GHz frequency band. In the future, additionally or alternatively, the APs 102-108 may support any other frequency band(s) that may be introduced in future versions of the wireless communication standards. The examples presented herein may apply to such future wireless frequency bands as applicable to the currently implemented wireless frequency bands. Each of the APs 102-108 may be configured to communicate with the respective client devices over a specific channel on the given wireless frequency band. If the number of available channels is fewer than the number of APs in the system 100, the APs in the system 100 may share channels. It may be understood that depending on the number of client devices connected to the APs 102-108, the type of data traffic, and/or the rate of data transfer, channel utilization of the APs 102-108 may vary.

In accordance with the examples presented herein, the network manager 110 may be configured to manage the allocation of channels to the APs 102-108, as will be described in greater detail below, in particular, to minimize performance impact in co-channels APs. In some examples, the network manager 110 may be implemented as a WLAN controller which may be communicatively coupled to the APs in the WLAN created via the APs. The network manager 110 may communicate with the APs 102-108 over connections 111, which may be wired and/or wireless interfaces. In some examples, the connections 111 between the network manager 110 and the APs 102-108 may be implemented according to wired communication protocol (e.g., Ethernet) or wireless communication protocols such as 802.11 standards, Wi-Fi Alliance Specifications, or any other wireless communication standards.

Although the system 100 is shown to have a single network manager 110, in some implementations, the system 100 may also include more than one network manager. In some other examples, the network manager 110 may be implemented on a cloud platform as a service. The network manager 110 as the service may be consumed on a subscription basis, for example, on a pay-per-use basis. In an example implementation where the network manager 110 may be hosted on the cloud platform, examples of the connections 111 may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet.

In some examples, the network manager 110 may include a processing resource 112 and/or a machine-readable storage medium 114 for the network manager 110 to execute several operations as will be described in the greater details below. The machine-readable storage medium 114 may be non-transitory and is alternatively referred to as a non-transitory machine-readable storage medium that does not encompass transitory propagating signals. The machine-readable storage medium 114 may be any electronic, magnetic, optical, or another type of storage device that may store data and/or executable instructions. Examples of the machine-readable storage medium 114 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 114 may be encoded with instructions 116 (depicted using a dashed box in FIG. 1) for allocating channels to the APs 102-108. Although not shown, in some examples, the machine-readable storage medium 114 may be encoded with certain additional executable instructions to perform any other operations performed by the network manager 110, without limiting the scope of the present disclosure. Further, in some examples, the machine-readable storage medium 114 may be encoded with measurement and location datastore 118 and weight and classification data 120.

In some examples, the machine-readable storage medium 114 may store information such as channel-specific parameters and location information corresponding to the APs 102-108 in the measurement and location datastore 118. The channel-specific parameters may include values of one or more of channel utilization and a channel quality metric (e.g., Modulation Coding Scheme (MCS) index). For illustration purposes in the description, the channel quality metric is described as the MCS Index, however, any other parameter or derivation of the same may also be used to define the channel quality metric. The channel utilization for a given AP may refer to a fraction or percentage of time that the given AP uses the channel to communicate with other devices (e.g., client devices). The channel quality metric, such as the MCS Index, may be indicative of the quality of the channel. The higher the MCS Index, the better the channel quality.

Further, the location information may be a location coordinate (e.g., information such as longitude and latitude) or a location descriptor (e.g., tags such as conference room, auditorium, gym, play area, guest area, and the like). The location information may specify where the APs have been deployed. Further, in some examples, as will be described in greater detail below, the processing resource 112 may determine a channel metric and a location metric based on the channel-specific parameters and the location information for each of the APs and store the channel metric and the location metric in the measurement and location datastore 118.

The processing resource 112 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 114, or combinations thereof. The processing resource 112 may fetch, decode, and execute the instructions 116 stored in the machine-readable storage medium 114 to allocate channels to the APs 104-108. As an alternative or in addition to executing the instructions 116, the processing resource 112 may include at least one integrated circuit (IC), control logic, electronic circuits, or combinations thereof that include a number of electronic components for performing the functionalities intended to be performed by the network manager 110.

In implementations where the network manager 110 is deployed on a cloud platform, the processing resource 112 and the machine-readable storage medium 114 may be representative of the processing resource and the machine-readable storage medium of a host computing system hosting the network manager 110 as a service, application, or a virtual resource (e.g., a virtual machine or a container).

In accordance with examples consistent with the present disclosure, the network manager 110 implements an enhanced technique of channel allocation. In particular, the network manager 110 may allocate channels to APs 104-108 in such a way that the performance impact on co-channel APs on any given shared channel may be reduced. For such an enhanced allocation of channels, the network manager 110 may first determine a channel metric and a location metric of each of the APs 102-108 based on the respective channel-specific parameters and location information stored in the measurement and location datastore 118. The network manager 110 may then determine a weight corresponding to each of the plurality of APs 102-108 based on the channel metric and the location metric. The network manager 110 may store the weights of the APs in the weight and classification data 120. In particular, the weight of an AP may be representative of a priority of the AP in terms of channel utilization. A higher weight of a given AP may indicate that the given AP may use the channel more heavily compared to other co-channel APs utilizing the same channel. Therefore, it is beneficial that such APs with higher weights do not share channels with other APs. Example methods of determining the channel metric, the location metric, and the weight for the APs are described in conjunction with the methods of FIGS. 2 and 3A-3B.

Further, the network manager may identify a first set of APs based on the weights. In some examples, the first set of APs may include the APs having weights higher than a predetermined threshold value. In particular, the first set of APs may be APs that heavily uses respective channels. Accordingly, the network manager 110 may allocate a dedicated first channel to each AP of the first set of APs for its sole use. Accordingly, each of the first set of APs may use a respective dedicated first channel, thereby reducing the performance impact on other APs in the network. For example, if the weight of the AP 102 is above the threshold value, the network manager 110 may assign a dedicated channel to the AP 102. In particular, the channel assigned to the AP 102 is not shared with the rest of the APs.

Further, the network manager may identify a second set of APs from the APs 102-108 based on the weights and allocate second channels for sharing among the second set of APs. The second set of the APs may include APs whose weights are smaller than the threshold value. By way of example, in the system 100, if the weights of the APs 104, 106, and 108 are smaller than the threshold value, the APs 104, 106, and 108 may be identified as the second set of APs and will be assigned one or more second channels. For example, if only a single channel has left after the allocation of the channel(s) to the first set of APs, the remaining single channel may the assigned to all the AP 104, 106, and 108. In particular, as the second set of APs does not share any channel with the first set of APs, the performance of the second set of APs may not be impacted due to the first set of APs.

Figure 2:
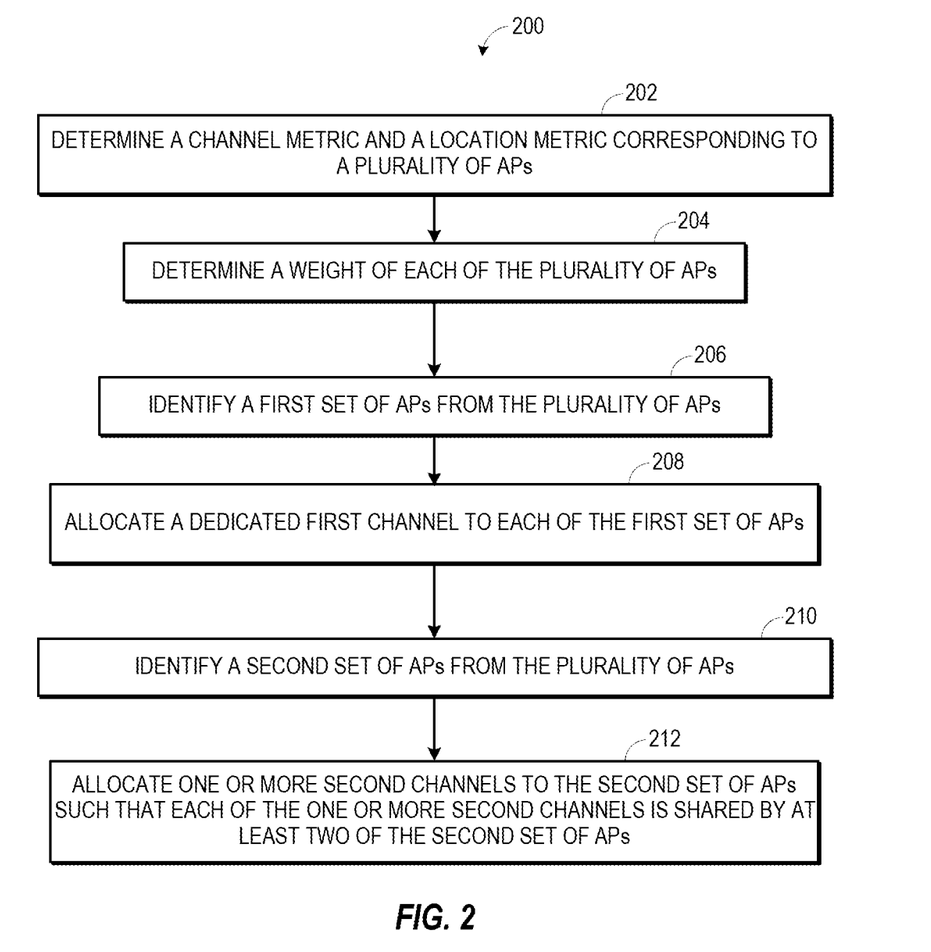
FIG. 2 depicts a flowchart of an example method for allocating channels to a plurality of access points (APs).

Referring now to FIG. 2, a flowchart of an example method 200 for allocating channels to APs is presented. In some examples, the steps shown in FIG. 2 may be performed by any suitable device, such as a network manager (e.g., the network manager 110 of FIG. 1). In some examples, the suitable device may include a hardware processing resource, such as one or more central processing units (CPUs), semiconductor-based microprocessors, and/or other hardware devices suitable for retrieval and execution of instructions (e.g., the instructions 116 depicted in FIG. 1) stored in a machine-readable storage medium. The processing resource may fetch, decode, and execute instructions, to allocate channels to APs as described. As an alternative or in addition to retrieving and executing instructions, the processing resource may include one or more electronic circuits that include electronic components for performing the functionality of one or more instructions, such as an FPGA, ASIC, or other electronic circuits. The processing resource and the machine-readable storage medium may be example representatives of the processing resource 112 and the machine-readable storage medium 114 of the network manager 110 of FIG. 1.

The method 200 includes several steps, for example, steps 202-212, in an order. However, the order of steps shown in FIG. 2 should not be construed as the only order for the steps. The steps may be performed at any time, in any order. For example, the steps 206 and 210 may be performed in parallel. Further, the 208 and 212 may also be performed in parallel. Additionally, the steps may be repeated or omitted as needed.

At step 202, the network manager may determine a channel metric and a location metric corresponding to a plurality of access points (APs).

The network manager may determine the channel metric based on one or more channel-specific parameters, for example, the channel utilization, the channel quality metric (e.g., an MCS Index), or a combination of both. In some examples, the network manager may obtain the values of the channel metric from the respective APs by polling the APs at regular intervals for respective channel-specific parameters. In response, the network manager may receive values of the channel-specific parameters, such as, the channel utilization and the MCS Index from each of the APs. Further, the network manager may store the channel utilization and the MCS Index corresponding to each of the APs in a measurement and location datastore, such as the measurement and location datastore 118 shown in FIG. 1, for example. Once the channel-specific parameters are obtained for the APs, the network manager may calculate the channel metric as a function of the channel-specific parameters. Additional details of determining the channel metric are described in conjunction with the example method of FIGS. 3A-3B.

In addition, the network manager may also maintain information about the locations of the APs based on the configuration data corresponding to each AP. The location information (e.g., location descriptor or location coordinates) may be provided or stored in the network manager by an administrator as configuration data of the respective AP during the configuration of the AP. The network manager may be configured to obtain the location information from such configuration data. Alternatively, in some examples, the APs may have location determination capability (e.g., by way of a global positioning system receiver installed in the APs) and such APs can provide their respective location information to the network manager, periodically or upon request by the network manager. The network manager may store the location information of each AP in the measurement and location datastore.

The network manager may determine the location metric (i.e., location-specific weight) based on the location information of the APs using predefined criteria specified by the administrator. For example, the administrator may define a priority value for each of the locations where the APs are deployed. For example, for 5 APs deployed at 5 different locations, the administrator may define respective priority values. Accordingly, the network manager may calculate the location metric for each APs based on a priority value of the respective location (for example, by multiplying the priority value with a multiplier, e.g., 10). By way of example, for the priority values for the 5 locations as 5, 4, 3, 2, 1 (wherein the higher number corresponds to a high-priority location), the network manager may determine the location metrics as 50, 40, 30, 20, and 10 (e.g., by multiplying the priority values by 10). In some examples, the administrator may specify and/or customize (override the calculated values by manually editing/inputting) the location metric. In particular, such customization or editing of the location metric may aid the administrators in planning channel allocation for any planned or unplanned event for specific locations. For example, if a training session is planned or ongoing in a conference room, the administrator may suitably adjust (i.e., increase) a location metric for the APs in the conference room.

Further, at step 204, the network manager may determine a weight of each of the plurality of APs. For example, for a given AP, the network manager may determine its weight based on its channel metric and the location metric determined at step 202. The network manager may apply one or more mathematical functions to the channel metric and the location metric to determine the weights of the APs. In one example, the network manager may determine a weight for an AP as a weighted sum of the channel metric and the location metric. Additional details of determining the weights of the APs are described in conjunction with the example method of FIGS. 3A-3B. In some examples, for illustration purposes, the network manager may determine the weights in such a manner that the APs that have higher utilization for a given location will have a higher weight.

Furthermore, at step 206, the network manager may identify a first set of APs from the plurality of APs based on the weight of each of the plurality of APs. The network manager may select the first set of APs based on predefined selection criteria. In one example, in order to identify the first set of APs, the network manager may compare the weights of each AP with a threshold value and may select the APs having a weight greater than the threshold value as the first set of APs. The threshold value may be set by the administrator, or dynamically determined by the network manager based on the weights of the APs. By way of example, the network manager may determine the threshold value as a value that is 80% of the highest weight of the weights determined at the step 204. The examples presented herein are not limited with respect to the specific calculation of the threshold value, and any suitable criteria may be applied to determine the threshold value.

In some other examples, the network manager may select a predefined percentage of the APs having higher weights as the first set of APs. In another example, the network manager may select APs whose weights are greater than the average weight of all APs as the first set of APs. In another example, the network manager may select APs whose weights are greater than the average weight by a predetermined number of standard deviations (e.g., 1, 2, or 3 standard deviations) as the first set of APs. In another example, the network manager may select a predetermined number of top-weighted APs as the first set of APs. In yet another example, the network manager may select an AP having the highest weight as the first set of APs.

After the first set of APs are identified, the network manager, at step 208, may allocate a dedicated first channel to each of the first set of APs. For example, if there are two APs identified as the first set of APs, each of the APs are assigned a dedicated channel for their sole use. These first set of APs may then connect with their respective client devices over the respective dedicated channels.

Further, at step 210, the network manager may identify a second set of APs from the plurality of APs based on the weight of each of the plurality of APs. By way of example, the network manager may select the APs having a weight lower than the threshold value as the second set of APs. In some other examples, the network manager may select APs whose weights are smaller than the average weight of all APs as the second set of APs. In another example, the network manager may select APs whose weights are smaller than the average weight by a predetermined number of standard deviations (e.g., 1, 2, or 3 standard deviations) as the second set of APs. In another example, the network manager may select a predetermined number of bottom-weighted APs as the second set of APs.

After the second set of APs are identified, the network manager, at step 212 may allocate one or more second channels to the second set of APs such that each of the one or more second channels is shared by at least two of the second set of APs. In some examples, the dedicated first channels assigned to the first set of APs and the second set of channels assigned to the second set of APs may belong to the same wireless frequency band. In certain other examples, the dedicated first channels assigned to the first set of APs and the second channels assigned to the second set of APs may belong to different wireless frequency bands. In particular, the second channels are assigned only to the second set of APs and are not shared with any of the first set of APs. Since the second set of APs does not share any channel with the first set of APs, the performance of the second set of APs may not be impacted due to the first set of APs.

Figure 3A:
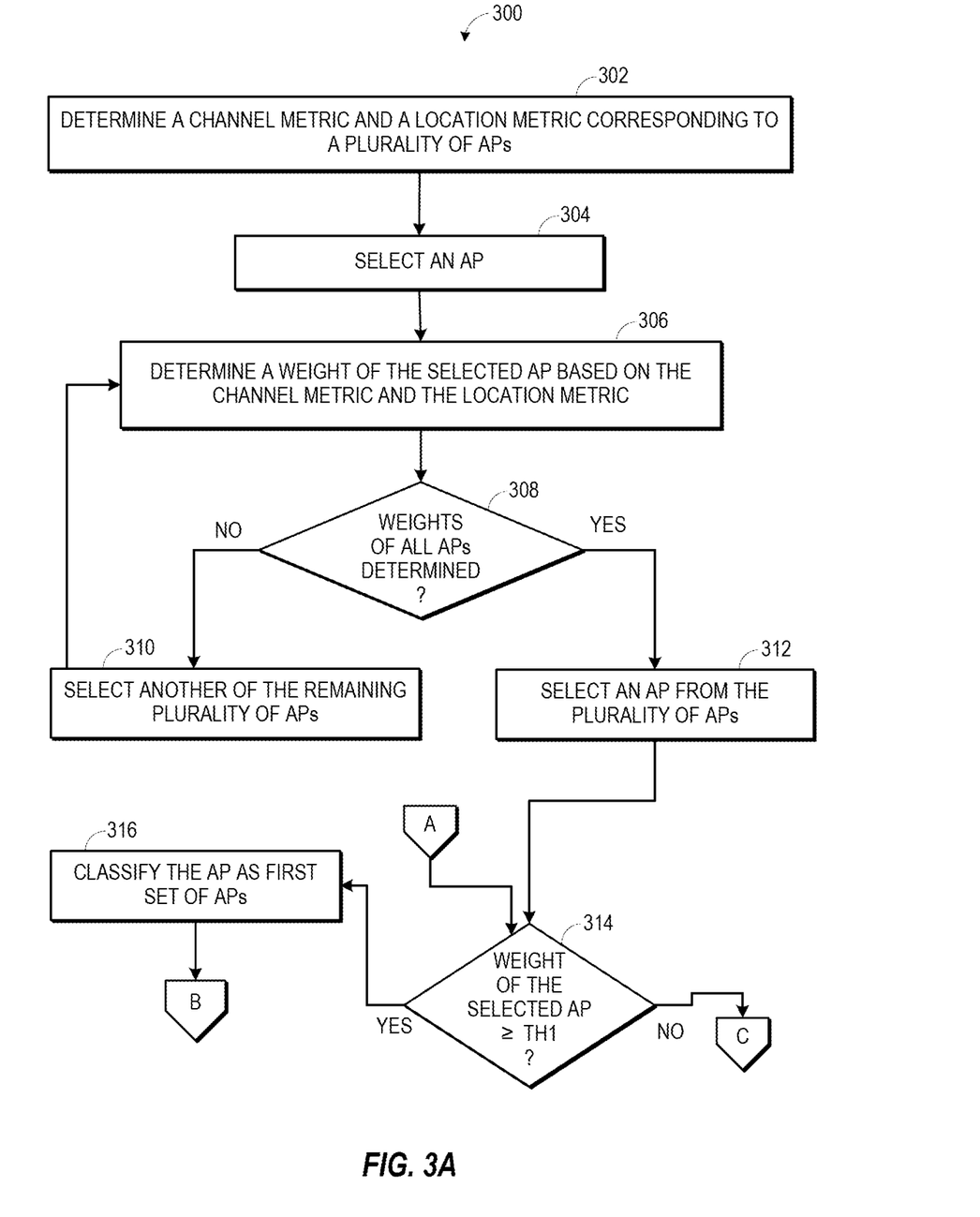
FIGS. 3A and 3B depict a flowchart of another example method for allocating channels to a plurality of APs.
Figure 3B:
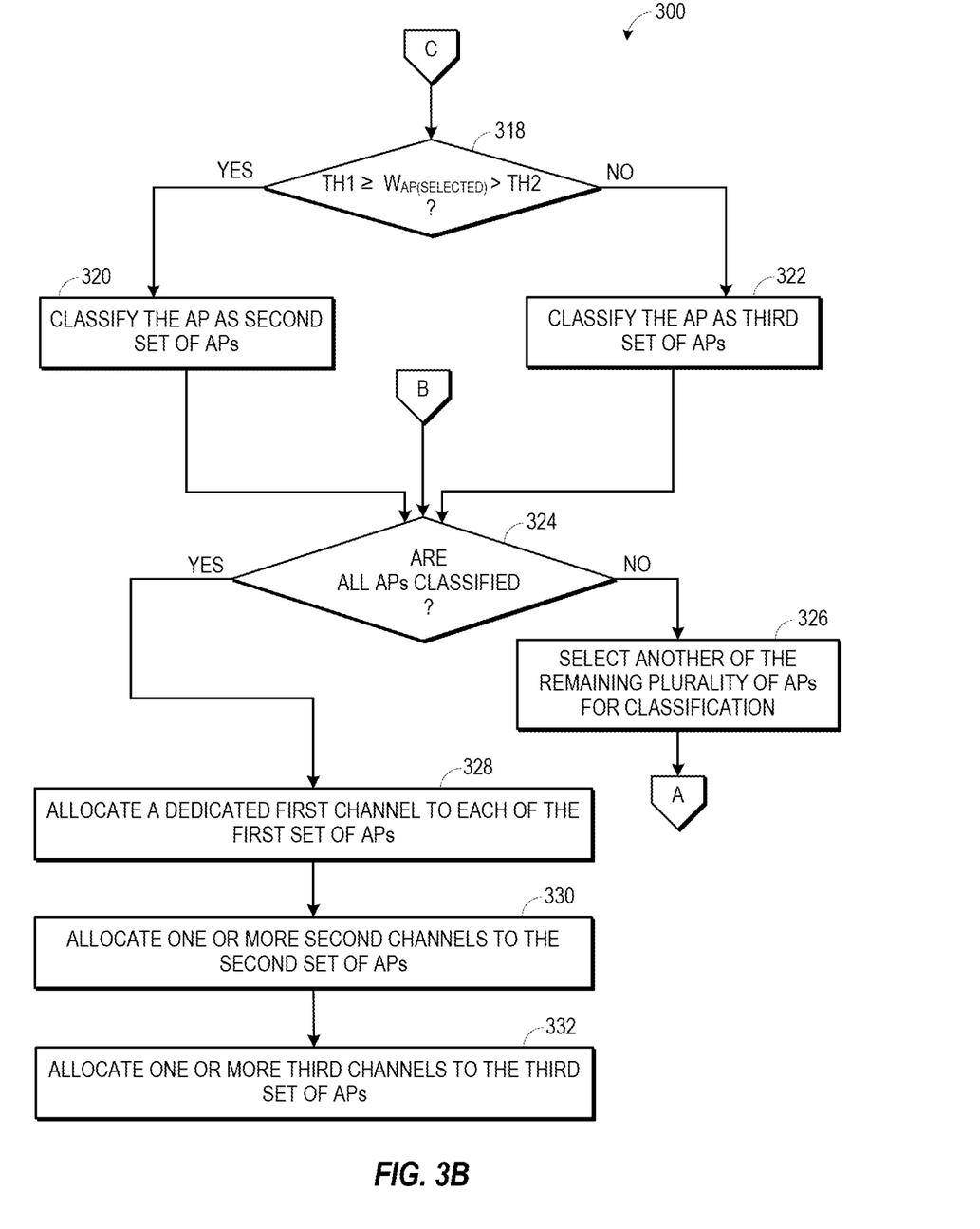

Turning now to FIGS. 3A and 3B, a flowchart of an example method 300 for allocating channels is depicted. The method 300 of FIGS. 3A-3B may be an example representative of the method 200 of FIG. 2. The method 300 include certain steps similar to those described in conjunction with the method 200, certain description of which is not repeated herein for the sake of brevity. In some examples, the steps shown in FIGS. 3A-3B may be performed by any suitable device, such as a network manager (e.g., the network manager 110 of FIG. 1) by way of executing instructions (e.g., the instructions 116 depicted in FIG. 1) via a processing resource. The method 300 includes several steps in an order. However, the order of steps shown in FIGS. 3A-3B should not be construed as the only order for the steps. The steps may be performed at any time, in any order. Additionally, the steps may be repeated or omitted as needed.

At step 302, the network manager may determine a channel metric and a location metric corresponding to a plurality of access points (APs). To determine the channel metrics for the APs, the network manager may obtain the channel-specific parameters, for example, the channel utilization, MCS Index (MI), or a combination of both from the respective APs, and store this information in a measurement and location datastore. After the channel-specific parameter values are obtained, the network manager may calculate the channel metric based on the channel-specific parameter values. In one example, the network manager may calculate the channel metric (CM) using an example relationship of Equation (1) for IEEE 802.11ax implementation (as the IEEE 802.11ax Specification supports twelve (12) MCS indexes), or Equation (2) for IEEE 802.11 specifications before IEEE 802.11ax (as the IEEE 802.11 Specification before IEEE 802.11ax may support up to ten (10) MCS indexes).

$$CM = \frac{CU + 100 * \left(1 - \frac{MI + 1}{12}\right)}{2} \quad \text{Equation (1)}$$

$$CM = \frac{CU + 100 * \left(1 - \frac{MI + 1}{10}\right)}{2} \quad \text{Equation (2)}$$

Table-1 represented below shows example channel-specific parameters and channel metrics. For illustration purposes, in Table-1, the channel utilization and MCS Index information are shown for eight (8) APs, for example, for AP1-AP8, and the channel metric is calculated using Equation (1).

TABLE 1

Example channel-specific parameters and channel metric

| AP | Channel Utilization (CU) % | MCS Index (MI) | Channel Metric (CM) |
|---|---|---|---|
| AP1 | 70 | 6 | 55.83 |
| AP2 | 50 | 5 | 50 |
| AP3 | 60 | 4 | 59.16 |
| AP4 | 30 | 8 | 27.5 |
| AP5 | 95 | 7 | 64.16 |
| AP6 | 90 | 9 | 53.33 |
| AP7 | 20 | 6 | 30.83 |
| AP8 | 10 | 7 | 21.66 |

Further, the network manager may also maintain location information (e.g., location descriptor or location coordinates) of the APs based on the configuration data corresponding to each AP. The network manager may store the location information of each AP in the measurement and location datastore and determine the location metric based on the location information using predefined criteria specified by the administrator. For example, the administrator may define a priority value for each of the locations where the APs are deployed. For example, for the eight APs shown in Table-1 deployed at various locations (see Table-2 depicted below), the administrator may define respective priority values. Accordingly, the network manager may calculate the location metric for each APs based on a priority value of the respective location (for example, by multiplying the priority value with a multiplier).

In some examples, the administrator may specify and/or customize (override the calculated values by manually editing/inputting) the location metric. In particular, such customization or editing of the location metric may aid the administrators in planning channel allocation for any planned or unplanned event. For example, if a training session is planned or ongoing in a conference room, the administrator may suitably adjust (i.e., increase) a location metric for the APs in the conference room. Table-2 presented below depicts example locations of the APs (e.g., AP1-AP8) and respective location metrics. For illustration purposes, the values of the location metric shown in Table-2 are predefined by the administrator, however, these values may also be calculated by the network manager without limiting the scope of the present disclosure.

TABLE 2

Example location information and location metric

| AP | Location | Location Metric (LM) |
|---|---|---|
| AP1 | Recreational Area | 30 |
| AP2 | Medical room | 70 |
| AP3 | Customer waiting lounge | 70 |
| AP4 | Reception | 60 |
| AP5 | Conference Room | 95 |
| AP6 | Conference Room | 95 |
| AP7 | Cafeteria | 40 |
| AP8 | Gym | 20 |

After the channel metric and the location metric are determined, the network manager may determine a weight for each of the APs. To determine the weights, the network manager may perform steps 304, 306, 308, and 310. In particular, at step 304, the network manager may select an AP of the plurality of APs (e.g., the AP1-AP8). Further, at step 306, the network manager may determine a weight of the selected AP based on the channel metric and the location metric corresponding to the selected AP. In particular, the network manager may obtain the values of the channel metric and the location metric from the measurement and location datastore and determine the weight of the selected AP as a weighted sum of the channel metric and the location metric. In some examples, the network manager may use the relationship of equation (3) to calculate the weight of the selected AP.

$$W_{Api} = \alpha \times CM + (1-\alpha) \times LM \qquad \text{Equation (3)}$$

where, $\alpha$ represents the weightage of the channel metric and i represents an identifier of the AP. In the present example with eight APs (AP1-AP8), i may be any value from 1 to 8. The weightage (a) may be defined and/or customizable by the administrator. By way of example, if the weightage ($\alpha$) is defined as 0.6, the weight of the AP1 ($w_{Ap}1$) may be determined as 45.5, with LM=55.83 and CM=30. It may be noted that the use of the relationship of equation (3) to calculate the weight of the selected AP is described for illustration purposes only. The network manager is also envisioned to use any different criteria and/or relationships to calculate the weight of the selected AP. After the weight of the selected AP is determined, the network manager may store the determined weight in a weight and classification datastore, for example, the weight and classification datastore 120 of FIG. 1.

After the weight of the selected AP is determined, the network manager, at step 308, may perform a check to determine if the weights of all APs have been determined. At step 308, if it is determined that weights have not been determined for all APs, the network manager may select another AP from the remaining APs whose weights have not been determined yet. The AP may then determine a weight for the newly selected AP at step 306. However, at step 308, if the network manager determines that the weights of all APs have been determined, the network manager at step 310 may proceed to classify the APs into two or more sets and allocate channels to the APs. For illustration purposes, in the description hereinafter, the APs are described as classified into three sets.

After determining the weights of all APs, the network manager, at step 312, may select an AP from the plurality of APs. Further, at step 314, the network manager may compare the weight of the selected AP with a first threshold value (TH1) to determine whether the weight of the selected AP is greater than or equal to the first threshold value. At step 314, if it is determined that the weight of the selected AP is greater than or equal to the first threshold value (i.e., YES at step 314), the network manager, at step 316, may classify the selected AP as the first set of AP. However, at step 314, if it is determined that the weight of the selected AP is smaller than the first threshold value, the network manager, at step 318, may compare the weight of the selected AP with a second threshold value (TH2) to determine if the weight of the selected AP is between the first threshold value and the second threshold value. The second threshold value may be smaller than the first threshold value.

At step 318, if it is determined that the weight of the selected AP is between the first threshold value and the second threshold value, the network manager, at step 320, may classify the selected AP as the second set of AP. However, at step 318, if it is determined that the weight of the selected AP is not between the first threshold value and the second threshold value (i.e., the weight of the selected AP is smaller than or equal to the second threshold value), the network manager, at step 322, may classify the selected AP into the third set of APs.

After the selected AP is classified into any of the first, second, or third sets of APs, the network manager may perform another check, at step 324, to determine whether each of the APs has been classified into any of the first, second, or third sets of APs. At step 324, if it is determined that each of the APs has not been classified, at step 326, the network manager may select another AP of the remaining APs to determine its classification by turning the execution to step 314. Likewise, each of the APs may be classified into one of the first, second, or third sets of APs. Table-3 represented below shows the weights of the APs AP1-AP8 determined using the example relationship of equation (3) and respective classification using the first threshold value as seventy (70) and the second threshold value as forty-five (45).

TABLE 3

Example weights and classification of APs

| AP  | Weights | Classification    |
|-----|---------|-------------------|
| AP1 | 45.5    | Second set of APs |
| AP2 | 58      | Second set of APs |
| AP3 | 63.5    | Second set of APs |
| AP4 | 40.5    | Third Set of APs  |
| AP5 | 76.5    | First set of APs  |
| AP6 | 67      | Second set of APs |
| AP7 | 34.5    | Third Set of APs  |
| AP8 | 21      | Third Set of APs  |

As depicted in Table-3, as the weight of AP5 is greater than 70, AP5 is classified as the first set of APs. Further, as the weights of AP1, AP2, AP3, and AP6 are between 70 and 45, AP1, AP2, AP3, and AP6 are classified as the second set of APs. Moreover, as the weights of AP1, AP2, AP3, and AP6 are smaller than 45, AP7, and AP8 are classified as the third set of APs.

Turning again to step 324, if it is determined that all APs have been classified, the network manager may proceed to allocate channels to the APs AP1-AP8 at steps 328, 330, and 332, depending on respective classifications. Although the steps 328, 330, and 332 are shown in series, the network manager may perform the steps 328, 330, and 332 in parallel.

In particular, at step 328, the network manager may allocate a dedicated first channel to each of the first set of APs. By way of example, the network manager may allocate a dedicated channel to AP5 which is identified as the first set of APs. In one example implementation, the network manager does not allow sharing of the dedicated channels allocated to the first set of APs with any other AP in the entire WLAN created by the AP or in a system such as the system 100 of FIG. 1. In another example implementation, the network manager may restrict the non-sharing or the dedicated use of these channel within a first predetermined region about the respective first set of APs. In one example, the first predetermined region may be an area defined by a first radius from the respective first set of APs. In some examples, the dedicated channel may be reusable, for instance, the network manager may allocate the dedicated channel to another AP (also referred to as a distant AP), if such AP is located away from the first AP at least by a first distance. By way of example, the network manager may share Channel 1 with another AP which is located away from AP5 by at least the first distance.

Further, at step 330, the network manager may allocate one or more second channels to the second set of APs. In particular, the one or more second channels may be shared among the second set of APs but may not be shared with the first set of APs. For example, the two channels may be allocated to the second set of APs AP1, AP2, AP3, and AP6. In particular, one of the second channels may be allocated to AP1 and AP2, and another second channel may be allocated to AP3 and AP6. In some examples, the network manager may allocate a common channel to the set of APs that are physically spaced apart from each other by at least a second distance to avoid and/or reduce any interference between the data communicated via such co-channel APs. In particular, in one example, Channel 2 may be allocated to AP1 and AP2, if AP1 and AP2 are spaced apart from each other by at least the second distance. Likewise, Channel 2 may be allocated to AP3 and AP6, if AP3 and AP6 are spaced apart from each other by at least the second distance. The second distance may be smaller than the first distance. In some examples, the first distance and the second distance may be defined and/or customized by an administrator.

Furthermore, at step 332, the network manager may allocate one or more third channels to the third set of APs. In particular, the third channels may be shared among the third set of APs but may not be shared with the first set of APs or the second set of APs. For example, a single third channel may be allocated to the third set of APs AP4, AP7, and AP8. In some examples, the network manager may allocate a common channel to the third set of APs that are physically spaced apart from each other by at least a third distance to avoid and/or reduce any interference between the data communicated via such co-channel APs. In particular, in one example, Channel 4 may be allocated to AP4, AP7, and AP8, if AP4, AP7, and AP8 are spaced apart from each other by at least the third distance. The third distance may be smaller than the second distance. In some examples, the third distance may also be defined and/or customized by an administrator.

Table-4 presented below shows an example distribution of four channels—channel 1 (100 MHz), channel 2 (44 MHz), channel 3 (149 MHz), and channel (120 MHz), among the eight APs AP1-AP8 based on the respective classification.

TABLE 4

Example channel allocation

| AP  | Classification    | Allocated Channel |
|-----|-------------------|-------------------|
| AP1 | Second set of APs | Channel 2         |
| AP2 | Second set of APs | Channel 2         |
| AP3 | Second set of APs | Channel 3         |
| AP4 | Third Set of APs  | Channel 4         |
| AP5 | First set of APs  | Channel 1         |
| AP6 | Second set of APs | Channel 3         |
| AP7 | Third Set of APs  | Channel 4         |
| AP8 | Third Set of APs  | Channel 4         |

As depicted in Table-4, from the available four channels, the network manager has allotted a dedicated channel (e.g., Channel 1) to AP5, allotted two shared channels to the second set of APs (e.g., AP1, AP2, AP3, and AP6), and allotted a single common channel to the third set of APs (e.g., AP4, AP7, and AP8). In particular, as the weights of the second set of APs are higher than the third set of APs, in some examples, the network manager may allocate the channels such that the third channels are fewer in number compared to the second channels. Also, the network manager may allocate the channels such that a third channel of the one or more third channels is shared with an increased number of APs compared to a second channel of the one or more second channels. In some examples, the second and third channels may be allocated such that each of the third channels has an increased number of co-channel AP compared to a second channel assigned to the second set of APs.

Figure 4:
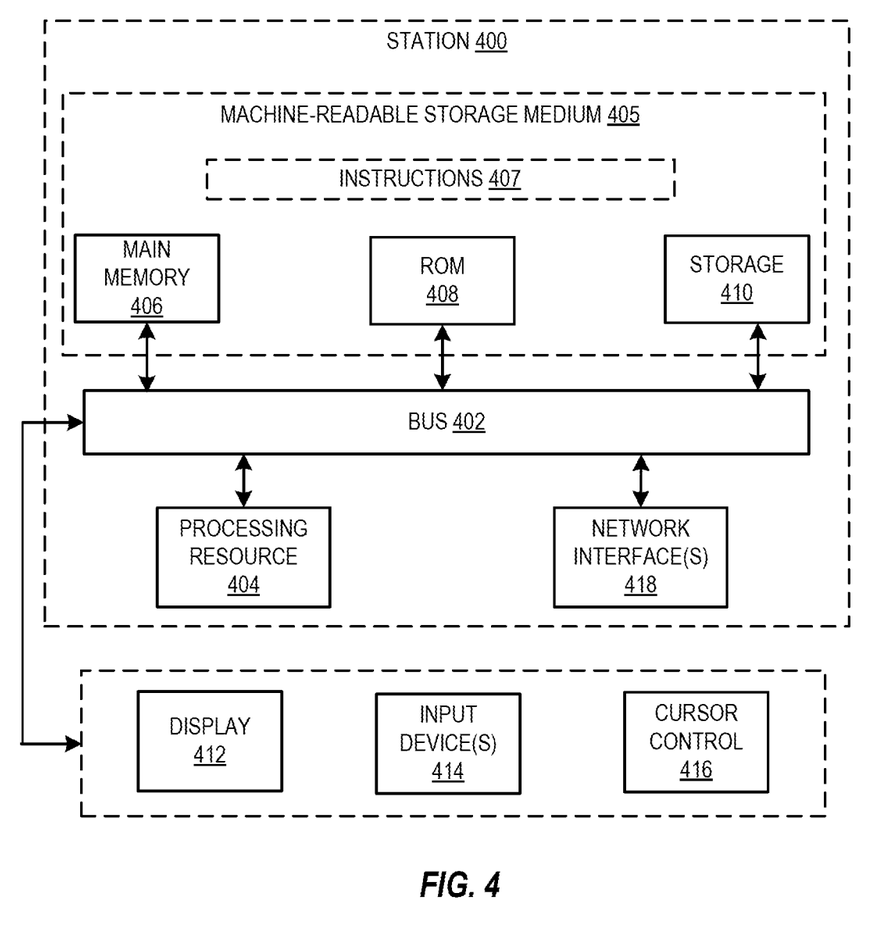
FIG. 4 depicts a block diagram of an example computing system in which various of the examples described herein may be implemented.

FIG. 4 depicts a block diagram of an example computing system 400 in which various of the examples described herein may be implemented. In some examples, the computing system 400 may be configured to operate as the network manager 110 of FIG. 1 and can perform various operations described in one or more of the earlier drawings. In some other examples, the computing system 400 may be a WLAN controller. Examples of the devices and/or systems that may be implemented as the computing system 400 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, set-top boxes, PDAs, mobile phones, smartphones, smart terminals, dumb terminals, virtual terminals, video game consoles, virtual assistants, IoT devices, and the like.

The computing system 400 may include a bus 402 or other communication mechanisms for communicating information, a hardware processor, also referred to as processing resource 404, and a machine-readable storage medium 405 coupled to the bus 402 for processing information. In some examples, the processing resource 404 may include one or more CPUs, semiconductor-based microprocessors, and/or other hardware devices suitable for retrieval and execution of instructions stored in a machine-readable storage medium 405. The processing resource 404 may fetch, decode, and execute instructions to allocate channels to APs. As an alternative or in addition to retrieving and executing instructions, the processing resource 404 may include one or more electronic circuits that include electronic components for performing the functionality of one or more instructions, such as an FPGA, an ASIC, or other electronic circuits.

In some examples, the machine-readable storage medium 405 may include a main memory 406, such as a RAM, cache and/or other dynamic storage devices, coupled to the bus 402 for storing information and instructions to be executed by the processing resource 404. The main memory 406 may also be used for storing temporary variables or other intermediate information during the execution of instructions to be executed by the processing resource 404. Such instructions, when stored in storage media accessible to the processing resource 404, render the computing system 400 into a special-purpose machine that is customized to perform the operations specified in the instructions. The machine-readable storage medium 405 may further include a read-only memory (ROM) 408 or other static storage device coupled to the bus 402 for storing static information and instructions for the processing resource 404. Further, in the machine-readable storage medium 405, a storage device 410, such as a magnetic disk, optical disk, or USB thumb drive (Flash drive), etc., may be provided and coupled to the bus 402 for storing information and instructions.

In some examples, the computing system 400 may be coupled, via the bus 402, to a display 412, such as a liquid crystal display (LCD) (or touch-sensitive screen), for displaying information to a computer user. In some examples, an input device 414, including alphanumeric and other keys (physical or software generated and displayed on a touch-sensitive screen), may be coupled to the bus 402 for communicating information and command selections to the processing resource 404. Also, in some examples, another type of user input device may be a cursor control 416, such as a mouse, a trackball, or cursor direction keys may be connected to the bus 402. The cursor control 416 may communicate direction information and command selections to the processing resource 404 for controlling cursor movement on the display 412. In some other examples, the same direction information and command selections as cursor control may be implemented via receiving touches on a touch screen without a cursor.

In some examples, the computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 400 also includes a network interface 418 coupled to bus 402. The network interface 418 provides a two-way data communication coupling to one or more network links that are connected to one or more local networks. For example, the network interface 418 may be an integrated services digital network (ISDN) card, cable modem, satellite modem, or a modem to provide a data communication connection to a corresponding type of telephone line. As another example, the network interface 418 may be a local area network (LAN) card or a wireless communication unit (e.g., Wi-Fi chip/module).

In some examples, the machine-readable storage medium 405 (e.g., one or more of the main memory 406, the ROM 408, or the storage device 410) stores instructions 407 which when executed by the processing resource 404 may cause the processing resource 404 to execute one or more of the methods/operations described hereinabove. The instructions 407 may be stored on any of the main memory 406, the ROM 408, or the storage device 410. In some examples, the instructions 407 may be distributed across one or more of the main memory 406, the ROM 408, or the storage device 410. In some examples, when the computing system 400 is configured to operate as an AP, the instructions 407 may include instructions that when executed by the processing resource 404 may cause the processing resource 404 to perform one or more of the methods described in FIGS. 2 and 3A-3B.

In some examples, one or more of the instructions 407 when executed by the processing resource 404 may cause the processing resource 404 to determine a channel metric and a location metric corresponding to a plurality of AP. Further, one or more of the instructions 407 when executed by the processing resource 404 may cause the processing resource 404 to determine a weight of each of the plurality of APs based on the channel metric and the location metric. Furthermore, one or more of the instructions 407 when executed by the processing resource 404 may cause the processing resource 404 to identify a first set of APs from the plurality of APs based on the weight of each of the plurality of APs and allocate a dedicated first channel to each of the first set of APs. Moreover, one or more of the instructions 407 when executed by the processing resource 404 may cause the processing resource 404 to identify a second set of APs from the plurality of APs based on the weight of each of the plurality of APs, and allocate one or more second channels to the second set of APs such that each of the one or more second channels is shared by at least two of the second set of APs.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising:
   determining, by a network manager, a channel metric and a location metric corresponding to a plurality of access points (APs);
   determining, by the network manager, a weight of each of the plurality of APs based on the channel metric and the location metric;
   identifying, by the network manager, a first set of APs from the plurality of APs based on the weight of each of the plurality of APs;
   allocating, by the network manager, a dedicated first channel to each of the first set of APs;
   identifying, by the network manager, a second set of APs from the plurality of APs based on the weight of each of the plurality of APs; and
   allocating, by the network manager, one or more second channels to the second set of APs such that each of the one or more second channels is shared by at least two of the second set of APs.

2. The method of claim 1, wherein determining the weight comprises determining a weighted sum of the channel metric and the location metric.

3. The method of claim 1, wherein identifying the first set of APs comprises:
   comparing the weight of each of the plurality of APs with a first threshold value; and
   classifying one or more of the plurality of APs having the weight greater than the first threshold value as the first set of APs.

4. The method of claim 3, wherein identifying the second set of APs comprises selecting one or more of the plurality of APs having the weight smaller than the first threshold value as the second set of APs, wherein the second set of APs is different from the first set of APs.

5. The method of claim 3, wherein identifying the second set of APs comprises:
   comparing the weight of each of the plurality of APs with a second threshold value; and
   classifying one or more of the plurality of APs having the weight between the first threshold value and the second threshold value as the second set of APs.

6. The method of claim 5, further comprising
   identifying, by the network manager, a third set of APs from the plurality of APs based on the weights and the second threshold value; and
   allocating, by the network manager, one or more third channels to the third set of APs such that the one or more third channels are shared among the third set of APs.

7. The method of claim 6, wherein the one or more third channels are fewer in number compared to the one or more third channels.

8. The method of claim 7, wherein a third channel of the one or more third channels is shared with an increased number of APs compared to a second channel of the one or more second channels.

9. The method of claim 1, wherein determining the channel metric comprises calculating the channel metric based on channel-specific parameters, wherein the channel-specific parameters comprise a channel utilization, a Modulation Coding Scheme (MCS) Index, or both the channel utilization and the MCS Index.

10. The method of claim 1, wherein determining the location metric comprises calculating a location metric based on location information.

11. The method of claim 1, wherein the dedicated first channel and the one or more second channels belong to a common wireless frequency band or different wireless frequency bands.

12. A network manager, comprising:
    a non-transitory machine-readable storage medium storing instructions;
    a processing resource coupled to the non-transitory machine-readable storage medium, wherein the processing resource is configured to execute one or more of the instructions to:
      determine a channel metric and a location metric corresponding to a plurality of APs;
      determine a weight of each of the plurality of APs based on the channel metric and the location metric;
      identify a first set of APs from the plurality of APs based on the weight of each of the plurality of APs;
      allocate a dedicated first channel to each of the first set of APs;
      identify a second set of APs from the plurality of APs based on the weight of each of the plurality of APs; and
      allocate one or more second channels to the second set of APs such that each of the one or more second channels is shared by at least two of the second set of APs.

13. The network manager of claim 12, the processing resource is configured to execute one or more of the instructions to:
    compare the weight of each of the plurality of APs with a first threshold value and a second threshold value; and
    select one or more of the plurality of APs having the weight greater than the first threshold value as the first set of APs; and
    select one or more of the plurality of APs having the weight between the first threshold value and the second threshold value as the second set of APs.

14. The network manager of claim 13, wherein the processing resource is configured to execute one or more of the instructions to:

identify a third set of APs from the plurality of APs based on the weights and the second threshold value; and allocate one or more third channels to the third set of APs such that the one or more third channels are shared among the third set of APs.

15. The network manager of claim 14, wherein:

the dedicated first channel allocated to each of the first set of APs is reusable by a distant AP located away from the first set of APs by a first distance; and a second channel of the one or more second channels is allocated to at least two APs of the second set of APs if the at least two APs of the second set of APs are spaced apart from each other by a second distance smaller than the first distance.

16. The network manager of claim 15, wherein a third channel of the one or more third channels is allocated to at least two APs of the third set of APs if the at least two APs of the third set of APs are spaced apart from each other by a third distance smaller than the second distance.

17. The network manager of claim 13, wherein allocating the one or more second channels to the second set of APs different from the dedicated first channel allocated to each of the first set of APs enhances performance of the second set of APs.

18. A system, comprising:

a plurality of APs deployed in a WLAN;

a network manager communicatively coupled to the plurality of APs, wherein the network manager is configured to:

determine a channel metric and a location metric corresponding to a plurality of APs;

determine a weight of each of the plurality of APs based on the channel metric and the location metric;

identify a first set of APs from the plurality of APs based on the weight of each of the plurality of APs;

allocate a dedicated first channel to each of the first set of APs;

identify a second set of APs from the plurality of APs based on the weight of each of the plurality of APs; and allocate one or more second channels to the second set of APs such that each of the one or more second channels is shared by at least two of the second set of APs.

19. The system of claim 18, wherein the network manager is deployed on a cloud platform.

20. The system of claim 18, wherein the network manager is a WLAN controller deployed in the WLAN.

* * * * *